United States Patent [19]

Bovio et al.

[11] 4,392,146

[45] Jul. 5, 1983

[54] NON-IMPACT DOT PRINTER

[75] Inventors: Michele Bovio, Brosso; Pierangelo Berruti, Chivasso; Walter Gillone, Ivrea, all of Italy

[73] Assignee: Ing. C. Olivetti & C., S.p.A., Ivrea, Italy

[21] Appl. No.: 245,370

[22] Filed: Mar. 19, 1981

[30] Foreign Application Priority Data

Mar. 20, 1980 [IT] Italy ............................. 67417 A/80

Feb. 2, 1981 [IT] Italy ............................. 67134 A/81

[51] Int. Cl.³ ............................................ G01D 15/08

[52] U.S. Cl. ............................................ 346/140 R

[58] Field of Search ........................... 346/140 PD, 75

[56] References Cited

U.S. PATENT DOCUMENTS 4,238,807 12/1980 Bovio et al. ......................... 346/140

*Primary Examiner*—Stafford D. Schreyer

*Attorney, Agent, or Firm*—Edward F. McKie, Jr.

[57] ABSTRACT

A serial dot matrix printer is of the non-impact solid ink type has the ink 102 contained in a tubular container 100 provided at one end with a printing orifice 106. In order to facilitate replacement of empty container, the container is provided with a grip 103 fixed to its central zone, which fits into the space between two resilient fixing forks 95, 96 rigid with the printer carriage 48. The end of the container remote from the orifice 106 is closed by a cap 110 which engaged by an electric contact 116 and connects to the ink rod 102 through a spring 107, for establishing the operating voltage between the ink rod and a counter-electrode 89 in the form of a laminar spring guiding the paper 82 round a platen 80.

13 Claims, 5 Drawing Figures

NON-IMPACT DOT PRINTER

BACKGROUND OF THE INVENTION

The invention relates to an impact-free dot printer with a print head of the ink jet type, mounted on a movable carriage and comprising a container of elongated form for the ink. The object of the invention is to provide such a printer in which the ink container is easily replaceable.

SUMMARY OF THE INVENTION

The technical problem is solved by the printer according to the invention, which is characterized by resilient means arranged to removably hold the container on the carriage, the container being mountable on the carriage by manual pressure.

DESCRIPTION OF THE DRAWINGS

The invention will be described in more detail, by way of example, with reference to the accompanying drawings, in which.

DESCRIPTION OF THE PREFERRED EMBODIMENT

Figures 1, 2:
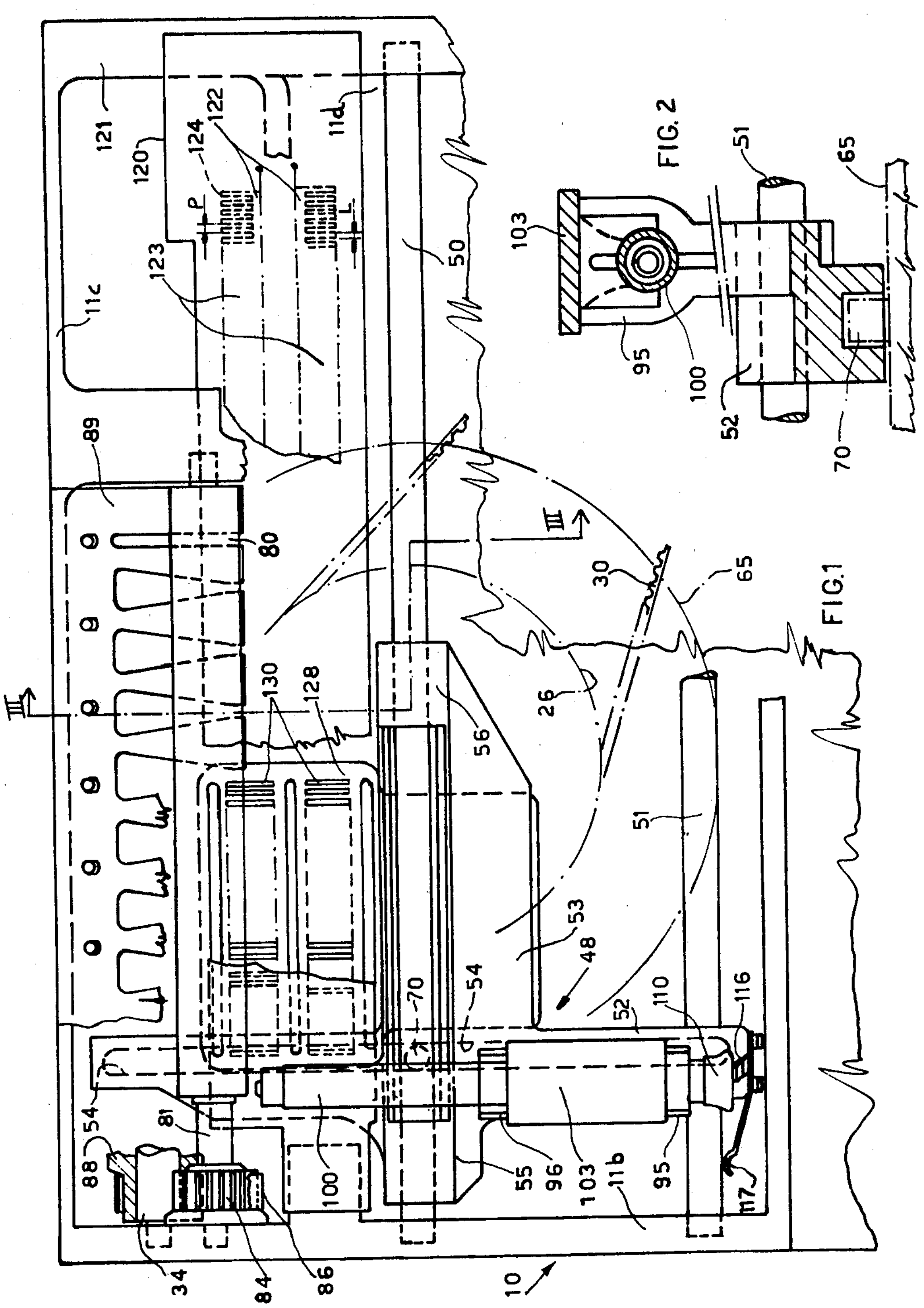
FIG. 1 is a partial plan view of a first embodiment of the printer according to the invention.
FIG. 2 is a sectional view according to line IV—IV of FIG. 1 to an enlarged scale.
Figure 3:
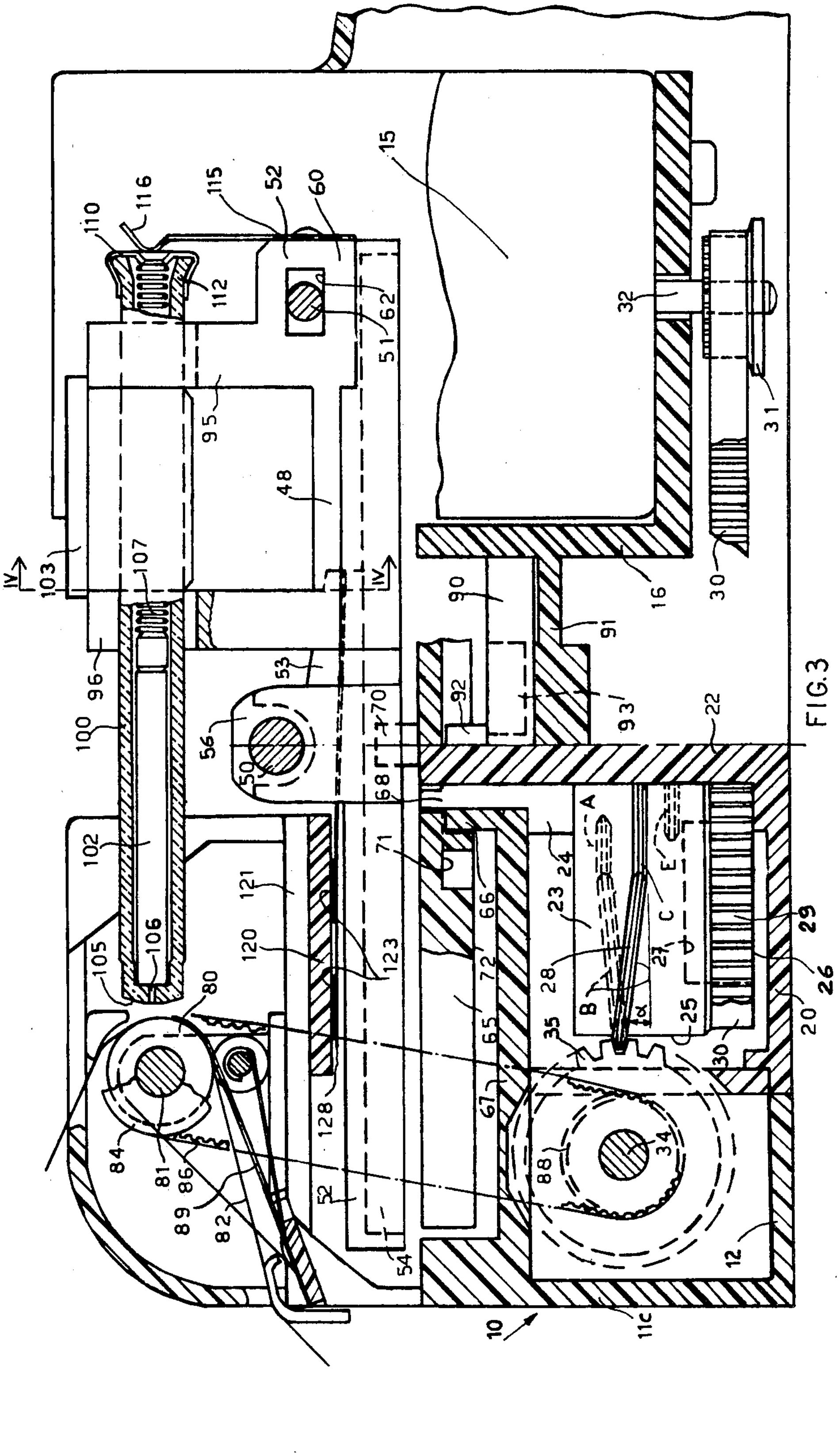
FIG. 3 is a longitudinal section on the line III—III of FIG. 1 to an enlarged scale.

With reference to FIGS. 1 and 3, a casing 10 having walls 11*b*, 11*c*, 11*d* and a bottom 12 encloses all the component parts of the printer according to the invention. A D.C. motor 15 is contained in a housing 18, with its axis of rotation vertical. A vertical shaft 22 is formed integrally with a cover 20, and on it there rotates a pulley 23 formed of a hub 23 and the cylindrical parts 25 and 26 connected to the hub 24 through spokes 27.

On the upper part 25 a variable pitch thread 28 is provided, whereas on the lower part 26 there is provided straight toothing 29 with which there engages a toothed belt 30, which also engages a toothed belt 30, which also engages with a sprocket wheel 31 of the shaft 32 of the motor 15.

A carriage 48 can slide on two parallel cylindrical guides 50 and 51 fixed to the casing 10. The carriage 48 is formed from a lower member 52, of elongated form transverse to the guides 50 and 51, which is rigidly connected to a support 53 elongated in a direction parallel to the guides 50 and 51.

In the lower member 52 of the carriage 48 there is provided a rectilinear slot 54 perpendicular to the guides 50 and 51, and the support 53 is rigid with two slide blocks 55 and 56 slidable on the guide 50. An aperture 62 in which the guide 51 passes is provided at one end 60 of the lower member 52. A disc 65 rotates on the free upper end of the shaft 22, supported by a collar 66 forming part of a rib 67 on the inside of the casing. The disc 65 is rotated by the pulley 23 by means of two pegs 68 rigid with the pulley 23.

A peg 70 with a vertical axis is fixed on the disc 65 near to its outer edge, and engages in the slot 54, so that the rotation of the disc 65 reciprocates the carriage 48 along the guides 50 and 51 with harmonic motion.

A circular slot 71 is provided in the lower face 72 of the disc 65 and is offset eccentrically by 180° with respect to the peg 70.

A slider 90 is slidable on trasverse guides 91 secured to the casing 10 and is provided with a peg 92, engaging the groove 71.

The slider 90 is also provided with additional masses 93, constituted by lead blocks, in order to balance the action of the mass of the carriage 48 on the disc 65.

The carriage 48 is also provided with a metal blade 128 having two sets of rectangular equidistant slots 130 and cooperating with a printed circuit board 120 for generating synchronizing signals. Particularly the circuit 120 is fixed to a rib 121 of the casing 10 and carries a track 122 in form of a double comb, constituted by a pair of longitudinal strips 123 each one connecting a plurality of arms 124 having a width L and spaced by a pitch P.

As it has been already described the counterweight slider 90 is weighted by slugs 93 so as substantially to cancel out the inertial forces of the reciprocating carriage. A platen 80 of material having a high coefficient of friction, for example rubber, is rigid with a shaft 81, rotatable in the casing 10. The platen 80 supports and entrains a strip of plain paper 82 on which the printing is to be carried out. On the shaft 81 there is keyed a toothed pulley 84 about which a toothed belt 86 is entrained. The belt is also entrained about a toothed pulley 88 rotatable on a shaft 34, and rigid with a helical gear 35 engaged with the thread 28. This latter includes a pair of portions B (only one being shown in FIG. 3) which are inclined by an angle $\alpha$ and are interleaned with three longitudinal portions A, C and E. The head 28 is thus adapted to control the line spacing of the paper at a predetermined time with respect to the transverse movements of the carriage 48.

A resilient metal strip 89 fixed to the casing 10, partly wraps about the platen 80 in order to guide and press the paper against the platen 80, and to constitute an electrode in the manner described hereinafter.

Figure 4:
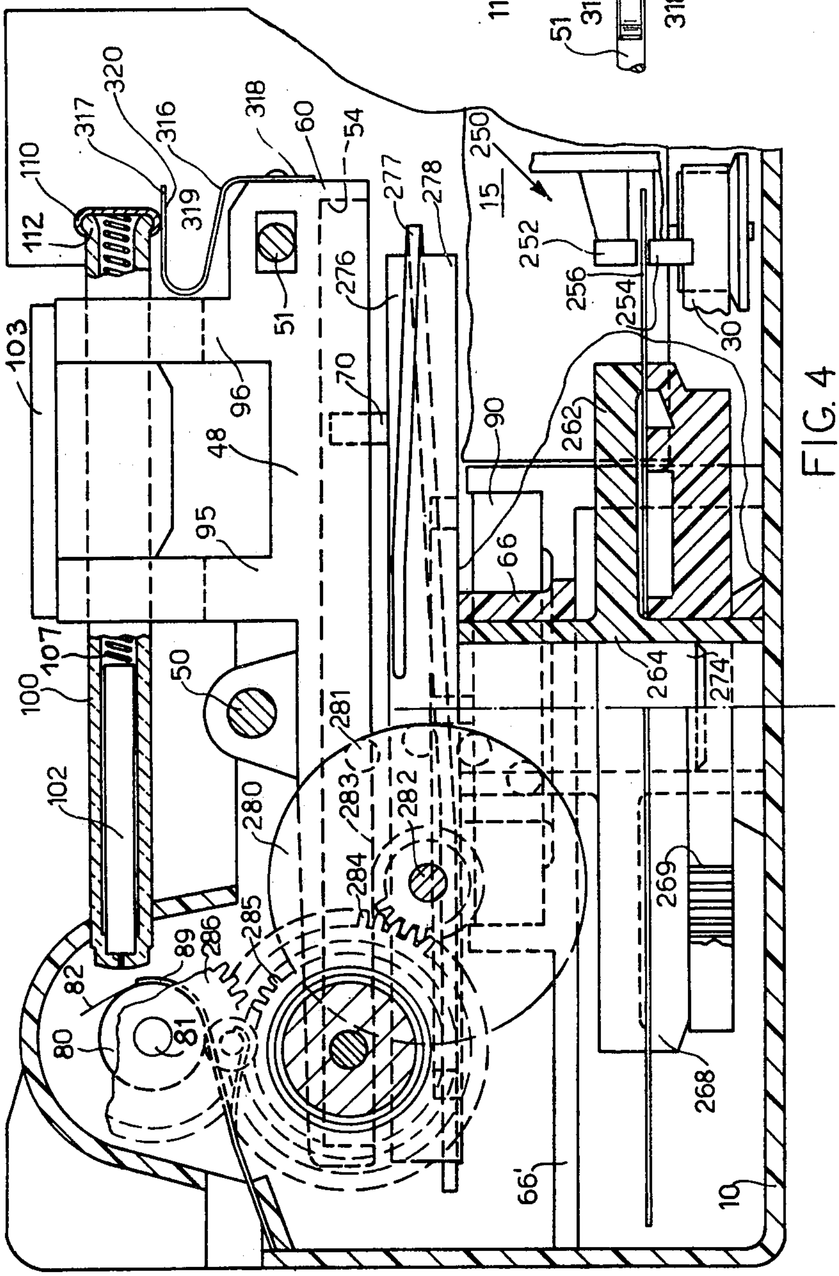
FIG. 4 is a longitudinal section through a second embodiment of a printer according to the invention.

In the top of the carriage 48 there are fixed two forks 95 and 96 (FIGS. 3, 4) between which a container or tube 100 of heat-resistant, insulating material, for example, glass, quartz, a ceramic material or a heat-resistant resin is gripped, being snapped into seats in the forks under pressure. The tube 100 is positioned perpendicularly to the roller 80 and contains a cylindrical rod 102 of ink composed of a solid mixture of powdered graphite and a resin binder as described in our published British patent specification No 2,014,514.

The end wall 105 facing the platen 80 has an orifice or small diameter bore 106. The rod 102 is kept pressed against the end wall 105 by a metal spring 107 retained by a substantially cylindrical metal cap 110 fitting over the tube 100 and fixed so that it closes the other open end 112 of the tube 100.

A leaf spring 115, fixed to the carriage 48, has two resilient arms 116 and 117 disposed perpendicularly to each other, so that the arm 116 presses on to the cap 110 to hold it in the closed position, and the arm 117 slides on the guide 51 in order to electrically connect the ink rod 102 of the metal guide 51. In order to be able to easily replace the tube 100 when its ink has run out, a grip 103 in the form of a plastics saddle of length equal to the distance between the forks 95 and 96 and insert-able between them, is fixed on to the tube 100 in a central position.

In operation, a high voltage generator is selectively operable to apply pulses to the ink rod via the spring 115, the cap 110 and the spring 107, the pulses being negative with respect to the counter electrode 89. The counter electrode is in the form of a fixed plate and, as is apparent from FIG. 1 of the drawings, it extends along the platen 80 over a length at least equal to the stroke of the carriage 48.

Figure 5:
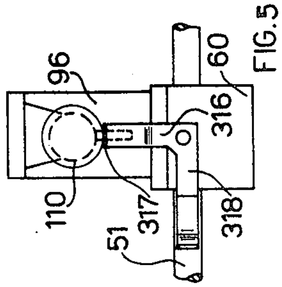
FIG. 5 is a frontal view of a detail of FIG. 4.

In a second embodiment of the invention, the peg 70 is carried by a disc 276 (FIGS. 4 and 5) rotatable about a vertical axis and connected to the counterweight 90 to balance the carriage intertia force so that the carriage moves transversely with reciprocating harmonic movement substantially in the manner heretofore described.

The printing head is operated by a strobe signal obtained by an optical transducer 250 constituted by a light emitting diode a phototransducer 254 and a strobe disc 256 provided with slots 258 in proximity to its periphery. The strobe disc 256 is fixed to a wheel 262 provided with a hollow hub 264 and rotatable on a bush 66 in one piece with a horizontal rib 66' of the casing 10. A backing disc 265 is a tight press fit on to the hub 264 in order to lock the strobe disc 256, which also carries a ring gear 269 with which the toothed belt 30 engages.

Inside the hollow hub 264 there is mounted a pin 274 rigid with the disc 276 provided with a scroll or thread 277 on its lateral surface 278. The scroll 277 engages with a wheel 280 comprising front pegs 281 and which rotates on a shaft 282 parallel to the printing platen 80. The wheel 280 transmits motion to the platen 80 by way of two pairs of gears 283, 284, 285 and 286 (FIG. 4), of which the gear 286 is connected to the shaft 81 of the platen 80 by way of a unidirectional clutch, not shown.

In order to make the insertion of the head tube 100 between two resilient forks 95, 96, easier, a leaf spring 316 is provided, fixed to the ends 60 of the carriage 48 and formed with two arms 317, 318 perpendicular to each other. The arm 317 is bent to form a loop 319 and a straight portion 320 lying below the metal cap 110, the outer surface of which is curved, while the bent end of the arm 318 is forced resiliently against the metal guide 51 to constitute a sliding contact. When the tube 100 is inserted between the forks 95, 96, the cap 110 comes into contact with the portion 320 of the spring 316.

We claim:

1. A non impact dot matrix printer having a print head of the ink jet-type, mounted on a movable carriage, said head comprising an ink container of elongated form, fixing means arranged to removably mount the container on the carriage, said fixing means comprising a pair of spaced-apart resilient forks rigid with the carriage and a grip rigid with the container, by means of which the container can be inserted between and extracted from the forks by manual pressure on the grip.

2. A printer as claimed in claim 1, wherein said grip is fixed on to the central zone of said container and is disposed between the forks when the container is mounted on the forks.

3. A printer as claimed in claim 1, comprising a high voltage generator selectively operable to apply negative pulses to the ink with respect to a counter electrode connected to said generator, said container being of insulating material and comprising at one end a terminal portion in electrical contact with the ink, an electrically conductive resilient element fixed on the carriage, said resilient element comprising a first part which permanently slides on a metal guide of the carriage connected electrically to the generator, and a second part having a horizontal portion in contact with said terminal portion of the container, only when the latter is inserted between the forks.

4. An ink jet head for a printer having a movable carriage and resilient fixing means secured to said carriage, said head comprising an elongated container for the ink and handling means fixed on the container to removably mount said container on said fixing means by manual pressure, in order to permit ready replacement of the container when said ink is exhausted.

5. A printer as claimed in claim 4, wherein said handling means comprise a saddle portion embracing said container and a flat manipulative grip connected to said saddle portion, whereby said container can be manually replaced without damage.

6. An ink jet head as claimed in claim 4, wherein said fixing means comprises a pair of spaced-apart resilient forks, and said handling means comprises a grip adapted to be manually operated to insert and extract said container from said pair of forks, a portion of said handling means embracing said container and having a length equal to the distance between said pair of forks being positioned between said pair of forks when the container is so inserted, whereby said container is precisely positioned on said carriage.

7. An ink jet head as claimed in claim 4 wherein said printer includes a metallic transverse guide for said carriage, an electrically conducting resilient element mounted on said carriage and having a first portion sliding on said metal guide and a second resilient portion in contact with said ink jet head only when the latter is mounted on said fixing means, whereby an electrical connection is established between said guide and said container.

8. An ink jet head as claimed in claim 7, wherein said container is of insulating material having a terminal conductive portion, electrically connected with said ink, said terminal portion pressing the second portion of said resilient element when said container is inserted between said forks.

9. A container as claimed in claim 4 or 8, wherein said terminal portion comprises a cap closed by an end wall arranged to cooperate with said resilient element acting in the direction of the container axis.

10. A container as claimed in claim 4 or 8, wherein said terminal portion comprises a cap having an outer curved surface arranged to cooperate with said resilient element acting in a radial direction with respect to the container.

11. A replaceable ink cartridge for use in an ink jet printer, comprising a cylindrical insulating container into which a rod of conductive solid ink is inserted, and terminating with an orifice at one end, the other end of the container being fitted with a conductive closure member in the form of a cap having an end wall closing said other end and a cylindrical portion embracing the container, resilient conductive means being provided for urging said ink towards said orifice and for electrically connecting it to said cap, said cartridge comprising a manipulative element having a saddle portion embracing said container and a flat portion to be hand held, whereby said cartridge can be manually replaced without damaging said container.

12. A printer as claimed in claim 11, wherein said saddle portion embraces said container substantially in the central position thereof.

13. A dot matrix printer comprising a non-impact print head of the ink jet type, having a container for a solid ink element, including a nozzle at an end thereof, an electrically insulating cylindrical platen for supporting a printing sheet, a carriage supporting said head and moveable parallel to said platen through a predetermined stroke, a high voltage generator selectively operable to apply negative pulse to said ink as to establish an electric discharge arc between said ink and a stationary counter electrode connected to a positive pole of said generator, whereby particles of ink are expelled through said nozzle toward said sheet, said counter electrode comprising a metallic resilient strip parallel to said platen and located between said container and the printing sheet substantially below said nozzle, spaced apart from said container end and yieldably pressed against the platen, said strip having a length at least equal to said stroke and an arcuate portion which partly wraps about said platen, whereby said counter electrode presses and guides said printing sheet on the platen.

* * * * *